(No Model.)
O. ZWIETUSCH.
METHOD OF AND APPARATUS FOR THE RECOVERY OF WASTE GASEOUS PRODUCTS IN BREWERIES.
No. 518,361. Patented Apr. 17, 1894.
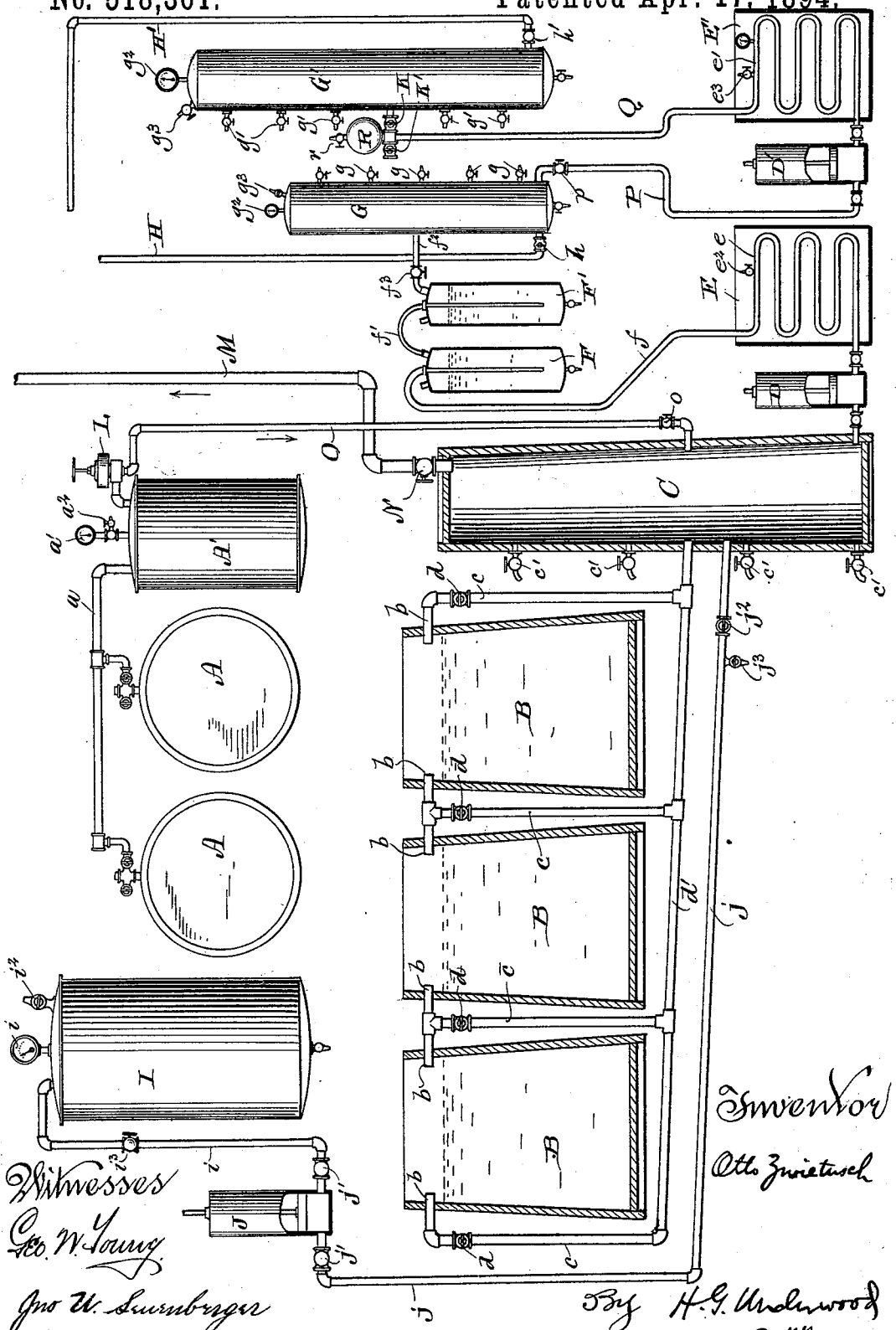

UNITED STATES PATENT OFFICE.

OTTO ZWIETUSCH, OF MILWAUKEE, WISCONSIN.

METHOD OF AND APPARATUS FOR THE RECOVERY OF WASTE GASEOUS PRODUCTS IN BREWERIES.

SPECIFICATION forming part of Letters Patent No. 518,361, dated April 17, 1894.

Application filed February 11, 1893. Serial No. 461,922. (No model.)

*To all whom it may concern:*

Be it known that I, OTTO ZWIETUSCH, a citizen of the United States, and a resident of Milwaukee, in the county of Milwaukee, and in the State of Wisconsin, have invented certain new and useful Improvements in Methods of and Apparatus for the Recovery of Waste Gaseous Products in Breweries; and I do hereby declare that the following is a full, clear, and exact description thereof.

My present invention relates to the collection of carbonic acid gas in breweries arising from the fermentation, and other sources, and which has heretofore been wasted, and utilizing it for various purposes, more especially for recarbonating and furnishing the beer with the necessary carbonic acid gas, thereby insuring great economy in the recovery of a valuable product, and it consists in a new and useful method or art for accomplishing this result as well as in the improved apparatus therefore, all as will be fully set forth hereinafter, and subsequently claimed.

The drawing is a general view of my improved apparatus, the several parts thereof being arranged in proper relative positions for the carrying out of my present method.

In the drawing, A A A' represent the regular cask connected system of a bunging apparatus; A A are casks containing beer in the finishing state; A' is the gas collection and escape tank of said bunging apparatus, connected by pipe $a$ and its connections with the said casks A A and having a gage $a'$ and air-escape cock $a^2$, as shown and a pressure regulator device, hereinafter described.

B B B represent the regular open fermenting tubs, each having two or more outlets, $b$ $b$, about five or ten inches from the top. These outlets are connected by pipes $c$ $c$ (having preferably suitable valves or cocks $d$ $d$) to an inclined pipe, $d'$, leading to the gas collector C. These pipes should be of sufficient diameter to enable the carbonic acid gas to pass freely therethrough. The tubs B B B are filled with the beer to be fermented, very nearly to the said outlets, which, when not in use, may be closed by means of the described valves $d$ $d$, or, if preferred, the openings in the said outlets, from the tubs, may be blocked up by bungs.

The gas collector C is a tightly closed vessel, located below the supply openings of the fermenting tubs B B B, and it must be located in the lowest suitable and coolest place in the brewery. The gas collector C is provided with a pipe M, leading to the outer air, and having a shut-off valve N.

L represents the pressure regulator of the bunging apparatus A A A', the same having an interior diaphragm and a vertically operating screw-rod to adjust the same to the required point indicated by the gage $a'$ and the carbonic acid gas resulting from the after fermentation in the casks A A, which escapes through the regulator L is conveyed by a pipe O into the gas collector C, this pipe being also provided with a suitable shut-off valve or cock $o$.

D D' represent compressors, or pumps, of any suitable construction, and operated in any convenient way; E E', cooling tanks; F F', purifiers, and G G', separating or storage cylinders, these last named cylinders being provided with series of try-cocks $g$ $g$, and $g'$ $g'$, respectively, to ascertain the amounts of carbonic acid gas, and of air, in the same. These cylinders G G' are provided with pressure-gages $g^2$ $g^2$, and air-escape-cocks $g^3$ $g^3$ and have pipes H H' (provided with cocks $h$ $h'$) leading therefrom, as hereinafter described.

I represents the vacuum cylinder for treating the beer under vacuum. J is a pump which sucks the carbonic acid gas from the top of said cylinder (through pipe $i$) and $j$ is another pipe which carries this gas down to and into the gas collector C.

The vacuum cylinder I is provided with a pressure or vacuum gage $i'$ and air-escape cock $i^2$, and the pipe $i$ is provided with a cock $i^3$. $j'$ $j'$ are the pump valves.

The pipe $j$ is provided with a shut-off valve $j^2$, adjacent to the gas collector C, and also with a switch-off or outlet cock $j^3$, to be opened for allowing the escape of air, and gas mixed with air, as in the beginning more air than carbonic acid gas is sucked by the pump J from the cylinder I, especially as carbonic acid gas is heavier than atmospheric air, and therefore it stays below, with the air on top, the same being true with the separating or storage cylinders G G' already described, and with the gas collector C, which has similar try-cocks $c'$ $c'$, as shown.

Notwithstanding the pipe M leading to the open air for the escape of the air in the gas collector C, there is always the probability that the air and gas which have been kept in said tank C for a considerable length of time will mingle to some extent, and to obviate this objection and separate the gas from the air as much as possible, I have devised the hereinbefore named compressors or pumps, cooling tanks (with their contained coils), purifiers, and separating or storage cylinders, which are operated in the following manner: The carbonic acid gas is pumped (by pump D) from the lower part of the gas collector C, through the coil $e$ in cooling tank E (which coil is provided, as shown, with an air-escape cock $e^2$, used chiefly in the beginning of the operation) and through the continuation $f$ of the coil $e$ to and through purifier F (containing any necessary solutions) and, if more than one purifier be used, through the connecting pipe $(f')$ to purifier F', and so on, and through the pipe $f^2$ leading from the last purifier (and which pipe should have a suitable valve or cock $f^3$) to and into the separating or storage cylinder G. The gas in this cylinder G may be brought up to a pressure of about fifty to one hundred pounds, by the first compression. If air is found in this cylinder, it is let off, as far as possible, by the proper upper cocks. From the lower part of this cylinder G, there extends a pipe H (with shut-off valve $h$), leading to a beer carbonator, such for example as is shown in my other application executed and filed on even date herewith, Serial No. 461,921.

If preferred, the cooling tank E may be located between the last purifier and the cylinder G, and by cooling the carbonic acid gas in the coil in this tank as low as possible (the lower the better) and by having the said gas under a higher pressure the heavier it becomes, this will serve to effect an easier separation of the air from the gas.

It may happen that it becomes necessary to bring the gas to a still higher pressure, or even to a state of liquefaction, in order to produce the complete separation of the air from the gas. To accomplish this, the gas is drawn by another pump (D') through pipe P (having a cock $p$) from the lower part of cylinder G, and thence forced into coil $e'$ being subjected, while in this coil, to a pressure of from five hundred and fifty to six hundred pounds to liquefy it, (there being an air-escape-cock $e^3$ on this coil, for use in the beginning of the operation) and thence the liquid gas is forced up through pipe Q (keeping up the pressure) to the double cock K K'. Above this cock is shown a globe R to collect the air (if there is any) which will separate from the liquid and which may be let off through the cock $r$. From this point, the liquid gas may be either carried into the storage cylinder G', through cock K, or into a transportable storage tank, if preferred, through cock K'. If the gas in the cylinder G' is to be used at once for carbonating beer, the cock $h'$, in the pipe H' leading from the lower part of this cylinder, is opened, and the gas led to the beer carbonator, substantially as already hereinbefore referred to, with respect to the gas from the cylinder G and pipe H.

To detect to what amount the separating or storage cylinders G G', as well as the gas collector C, are filled with carbonic acid gas, or air, I use the different try-cocks, $g$, $g'$, or $c'$, already described, by trying whether a light will burn under the escape of such cock, as it will only burn under the escape of air, but not of gas, or the test may be made by any other practical method.

It is only absolutely essential to have the gas collector C placed below the fermenting tubs, and its location must absolutely be in the lowest suitable and coolest place in the brewery, as already stated. As to the pumps or compressors, cooling tanks, purifiers and separating or storage cylinders, they may preferably be also located in cool rooms, but this is not absolutely necessary.

A better fermentation can be procured by taking the carbonic acid gas off from the surface of the fermenting beer. When a higher layer of carbonic acid gas is upon the fermenting beer, it retards the free fermentation, which is often and mostly caused when the fermenting tubs are not filled high enough with beer, thereby allowing too much space between the level of the beer, and the open walls of the fermenting tubs. The carbonic acid gas does not escape out of these walls, and by having a higher layer of gas upon the surface of the fermenting beer, it retards the fermentation, and this act of delaying the fermentation is what I prevent by my method of drawing the gas above the surface of the fermenting tubs.

When the carbonic acid gas, saved and collected as hereinbefore described, is to be used directly for the carbonization of beer on its way from the first ruh cask to the second resting cask or series of casks (in the method set forth in my hereinbefore named other application for patent, executed and filed on even dates herewith) or is to be stored up, for such use, in suitable storage casks, there may be used, if preferred, only one of the described pumps or compressors (D), and the purifiers (F F') may be dispensed with entirely, as the carbonic acid gas derived from the sources named (especially that obtained from the main fermentation) is mostly pure and clear, being richly impregnated with flavors, especially hop aroma, which is maintained in the gas, when the latter is carried into the beer becoming carbonated, and proves a most valuable element. While this recovered gaseous product has been especially described as suitable for the carbonization of beer, it will be understood that I do not, in any sense, limit myself thereto, as the same may be utilized for cooling purposes, in ice-machines, or otherwise, and under such circumstances the described purification is not essential, as the gas may be used, immediately after collection, and elimination of atmospheric air therefrom, for many purposes, and especially after it has been compressed to the point of liquefaction, as described, irrespective of the taste or odor of it, at this stage.

My present invention is, in part, an improvement on that patented to me July 13, 1880, under No. 229,934, in which I disclosed the initial step of collecting the heretofore wasted carbonic acid gas given off in brewing processes, but without my subsequent steps of eliminating atmospheric air, and purifying, condensing and liquefying the product.

After my process is well under way, very little air will be drawn in with the gas from the closed vessels, shown in my drawing, but the gas is all drawn into the collector C from all sources, including the open fermentation tubs, and when the compressor begins to draw off the gas from the said collector then as the fermentation in some one or more of the open tubs ceases, air will be drawn therefrom, and hence there is continually more or less air being sucked into collector C from some source, and this air, as stated, must be removed, to which end the pipe M on the collector, and the air escape cock on the separator vessel G, come into play, and the separation of this air from the gas consequently constitutes a vital and essential step in my process.

Having thus described my invention, what I claim as new, and desire to secure by Letters Patent, is—

1. The herein described method of utilizing the heretofore waste product of carbonic acid gas derived from the main fermentation and other brewing processes, consisting in collecting the same in a suitable closed vessel, separating the atmospheric air therefrom, and forcing the gas through purifiers to suitable storage receptacles, ready for immediate or future use.

2. The herein described method of utilizing the heretofore waste product of carbonic acid gas derived from the main fermentation and other brewing processes, consisting in collecting the same in a suitable closed vessel placed in the lowest and coolest portion of the brewery, separating the atmospheric air therefrom as much as possible, pumping the gas through a coil in a cooling tank, and forcing it through a purifier or purifiers to a suitable storage receptacle.

3. The herein described method of collecting the carbonic acid gas, heretofore wasted, from the main fermentation, and other brewing processes, and treating the same for re-use, by leading it into one or more vessels for separating and purifying the gas from air and other substances, under the required pressure, and temperature.

4. The herein described method of utilizing the carbonic acid gas, heretofore wasted, from the main fermentation, and other brewing processes, by collecting the same in a suitable closed vessel, leading the gas through purifiers, and cooling it, and compressing the gas in a suitable separating cylinder, expelling the air from the upper part thereof, and leading the purified carbonic acid gas from the lower part of the separator, to the place of use or storage.

5. The herein described method of utilizing the carbonic acid gas, heretofore wasted, from the main fermentation, and other brewing processes, consisting in collecting the same in a suitable closed vessel, and carrying it through suitable compressors and separators, and expelling the atmospheric air therefrom.

6. The herein described method of utilizing the carbonic acid gas, heretofore wasted, from the main fermentation, and other brewing processes, consisting in collecting the same in a suitable closed vessel, drawing off the atmospheric air therefrom leading the gas through a compressor and compressing it to the degree of liquefaction; extracting the atmospheric air from above this liquefied gas, and forcing the latter to a suitable storage receptacle for immediate or future use.

7. The herein described method of utilizing the heretofore waste product of carbonic acid gas given off in brewing processes, consisting in collecting the same in a suitable closed receptacle, freeing it from atmospheric air, and compressing it to the point of liquefaction.

8. The herein described method of utilizing the carbonic acid gas, heretofore wasted, from the main fermentation, and other brewing processes, consisting in collecting the same in a suitable vessel, forcing the gas from there into a separating vessel, expelling the atmospheric air from the upper part thereof, leading the gas through a compressor and compressing it to the degree of liquefaction, and forcing the latter to a suitable storage receptacle for immediate or future use.

9. The herein described method of utilizing the heretofore waste product of carbonic acid gas derived from the main fermentation and other brewing processes, consisting in collecting the same in a suitable receptacle, drawing off the atmospheric air therefrom, and forcing the gas under suitable pressure to a storage receptacle, ready for immediate or future use.

10. In apparatus for the recovery of waste carbonic acid gas, the combination of a gas collector, having one or more pipes leading thereto from the sources of production of the gas, and an air pipe leading from the top of said collector to the outer air, with a pump or compressor, a pipe leading thereto from the lower part of said collector, and a cooling tank, containing a coil connected directly to said compressor, and leading the compressed gas to the device adapted for storage, use or further treatment.

11. In apparatus for the recovery of waste carbonic acid gas, the combination of a gas collector, having one or more pipes leading thereto from the sources of production of the gas, and an air pipe leading from said collector to the outer air, with a pump or compressor, a cooling tank containing a coil connected to said compressor, a purifier located between the compressor and storage device, a series of suitable valve-controlled connecting pipes between the several parts named, and a pipe leading to the place of use or storage.

12. In apparatus for the recovery of waste carbonic acid gas, the combination of a gas collector, having one or more pipes leading thereto from the sources of the production of the gas, and an air-escape pipe or outlet, with a pump or compressor, a cooling tank containing a coil connected to said compressor, a storage or separating cylinder, a purifier located between said compressor and said cylinder, a series of suitable valve-controlled connecting pipes between the several parts named, and a pipe leading from the said storage or separating cylinder.

13. In apparatus for the recovery of waste carbonic acid gas, the combination of a gas collector having one or more pipes leading thereto from the sources of production of the gas, and a suitable air-escape pipe or outlet, with a series of pumps or compressors, a series of cooling tanks containing coils, a purifying device, a storage or separating cylinder, a series of suitable valve-controlled connecting pipes between the several parts named, a pipe leading from the last cooling tank coil, and provided with a double cock, and an air-collecting globe, provided with an air-escape cock, located above the said double cock.

14. In apparatus for the recovery of waste carbonic acid gas, the combination of a gas collector having one or more pipes leading thereto from the sources of production of the gas, and a suitable air-escape pipe or outlet, with a series of pumps or compressors, a series of cooling tanks containing coils, a purifying device, a series of storage or separating cylinders, a series of suitable valve-controlled connecting pipes between the several parts named, an outlet cock interposed between the last storage or separating cylinder and the pipes leading thereto, an air-collecting globe provided with an air-escape cock above the said outlet cock, and a pipe leading from the said last storage or separating cylinder.

In testimony that I claim the foregoing I have hereunto set my hand, at Milwaukee, in the county of Milwaukee and State of Wisconsin, in the presence of two witnesses.

OTTO ZWIETUSCH.

Witnesses:
H. G. UNDERWOOD,
C. W. SCOTT.